US009391549B2

(12) United States Patent
 Hirata

(10) Patent No.: US 9,391,549 B2
(45) Date of Patent: Jul. 12, 2016

(54) MOTOR DRIVING DEVICE

(71) Applicant: Rohm Co., Ltd., Kyoto (JP)

(72) Inventor: Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/491,408

(22) Filed: Sep. 19, 2014

(65) Prior Publication Data

US 2015/0084559 A1    Mar. 26, 2015

(30) Foreign Application Priority Data

Sep. 24, 2013  (JP) ................................. 2013-197444

(51) Int. Cl.
 *H03L 7/00* (2006.01)
 *H02P 6/16* (2016.01)
(52) U.S. Cl.
 CPC ...................................... *H02P 6/16* (2013.01)
(58) Field of Classification Search
 CPC ............... H02P 6/16; H02P 6/10; H02P 6/08
 USPC .......... 318/400.01, 400.05, 400.14, 430, 432,
       318/503, 606, 607, 147, 723, 807, 827, 799,
       318/801, 400.15, 721; 322/29; 324/442,
       324/436, 236; 329/302, 306; 331/13, 23,
       331/47, 34
 See application file for complete search history.

(56) References Cited

U.S. PATENT DOCUMENTS

| 5,644,199 | A | * | 7/1997 | Nojima | H02N 2/166 310/311 |
| 5,670,852 | A | * | 9/1997 | Chipperfield | F04B 49/06 318/250 |
| 6,069,854 | A | * | 5/2000 | Koudo | G11B 19/247 369/47.19 |
| 6,081,091 | A | * | 6/2000 | Mitchell | H02P 6/182 318/254.2 |
| 6,741,046 | B1 | * | 5/2004 | Krauth | H02P 6/22 318/400.11 |
| 6,885,160 | B2 | * | 4/2005 | Takeuchi | B60L 11/1805 318/139 |
| 7,342,367 | B2 | * | 3/2008 | Suzuki | H02P 23/0068 318/400.04 |
| 8,049,448 | B2 | * | 11/2011 | Yang | H02P 6/16 318/400.03 |

FOREIGN PATENT DOCUMENTS

WO      2011/099262      8/2011

* cited by examiner

*Primary Examiner* — Antony M Paul
(74) *Attorney, Agent, or Firm* — Fish & Richardson P.C.

(57) ABSTRACT

A motor driving device includes a clock oscillator configured to generate a clock signal; and a logic unit configured to receive the clock signal, control conduction of a 3-phase brushless direct current (DC) motor, and generate a revolutions per minute (RPM) detection signal. The clock oscillator is configured to switch an oscillation frequency of the clock signal depending on an RPM command signal input to set a target RPM of the 3-phase brushless DC motor.

9 Claims, 7 Drawing Sheets

MOTOR DRIVING DEVICE

This application is based upon and claims the benefit of priority from Japan Patent Applications No. 2013-197444, filed on Sep. 24, 2013, the entire contents of which are incorporated herein by reference.

TECHNICAL FIELD

The present disclosure relates to a motor driving device for driving a 3-phase brushless direct current (DC) motor.

BACKGROUND

A logic unit of a motor driving device consumes a greater amount of power as a circuit size thereof is increased. Further, a brushless motor driving device capable of reducing standby power of a logic unit by cutting off power supply to the logic unit when an operation of a motor is stopped is known.

However, if the power being supplied to the logic unit is cut off when the operation of the motor is stopped, the logic unit stops working, and thus, conduction of the motor cannot be controlled and a signal for detecting the revolutions per minute (RPM) of the motor cannot be generated as well. For these reasons, for example, even though an outdoor fan of an air-conditioner continues to be rotated by receiving wind even when power is not being supplied to the motor, the rotation of the outdoor fan cannot be recognized.

SUMMARY

The present disclosure provides some embodiments of a motor driving device capable of reducing standby power, while monitoring rotation of a motor.

According to one aspect of the present disclosure, there is provided a motor driving device, including: a clock oscillator configured to generate a clock signal; and a logic unit configured to receive the clock signal, control conduction of a 3-phase brushless direct current (DC) motor, and generate a revolutions per minute (RPM) detection signal, wherein the clock oscillator is configured to switch an oscillation frequency of the clock signal depending on an RPM command signal input to set a target RPM of the 3-phase brushless DC motor (first configuration).

Further, in the motor driving device having the first configuration, the clock oscillator is configured to set the oscillation frequency of the clock signal as a first oscillation frequency when the RPM command signal has a signal value for an operation time of the motor, and to set the oscillation frequency of the clock signal as a second oscillation frequency lower than the first oscillation frequency when the RPM command signal has a signal value for a stoppage time of the motor (second configuration).

In addition, in the motor driving device having the second configuration, the clock oscillator is configured to switch the oscillation frequency of the clock signal based on a comparison result of an RPM command voltage input as the RPM command signal and a predetermined threshold voltage (third configuration).

Also, in the motor driving device having the third configuration, the clock oscillator includes: a master clock oscillating circuit configured to generate a master clock signal; a dividing circuit configured to divide the master clock signal to generate a divided clock signal; a selecting circuit configured to selectively output one of the master clock signal and the divided clock signal as the clock signal depending on a switching signal; and a comparing circuit configured to compare the RPM command voltage and the threshold voltage to generate the switching signal (fourth configuration).

Furthermore, in the motor driving device having the third configuration, the motor driving device further includes: a triangular wave oscillator configured to generate a triangular wave voltage with a predetermined frequency; and a pulse width modulation (PWM) comparator configured to compare the RPM command voltage and the triangular wave voltage to generate a PWM signal, wherein the logic unit is configured to control an RPM of the 3-phase brushless DC motor depending on the PWM signal (fifth configuration).

In addition, in the motor driving device having the first configuration, the motor driving device further includes a position signal generating unit configured to generate a position signal depending on a position of a rotor of the 3-phase brushless DC motor, wherein the logic unit is configured to control excitation phase switching of the 3-phase brushless DC motor and generate the RPM detection signal depending on the position signal (sixth configuration).

Also, in the motor driving device having the sixth configuration, the position signal generating unit is configured to receive a hall signal from a hall sensor or a hall IC to generate the position signal (seventh configuration).

In the motor driving device having the sixth configuration, the position signal generating unit is configured to monitor an induction voltage generated in a motor coil to generate the position signal (eighth configuration).

According to another aspect of the present disclosure, there is provided an electric device, including: a 3-phase brushless DC motor; the motor driving device according to claim 1 for driving the 3-phase brushless DC motor; and a microcomputer configured to monitor an RPM detection signal generated by the motor drive device (ninth configuration).

Further, in the electric device having the ninth configuration, the 3-phase brushless DC motor is a fan motor for rotating a fan (tenth configuration).

DETAILED DESCRIPTION

One embodiment of the present disclosure will now be described in detail with reference to the drawings.

<Overall Configuration>

Figure 1:
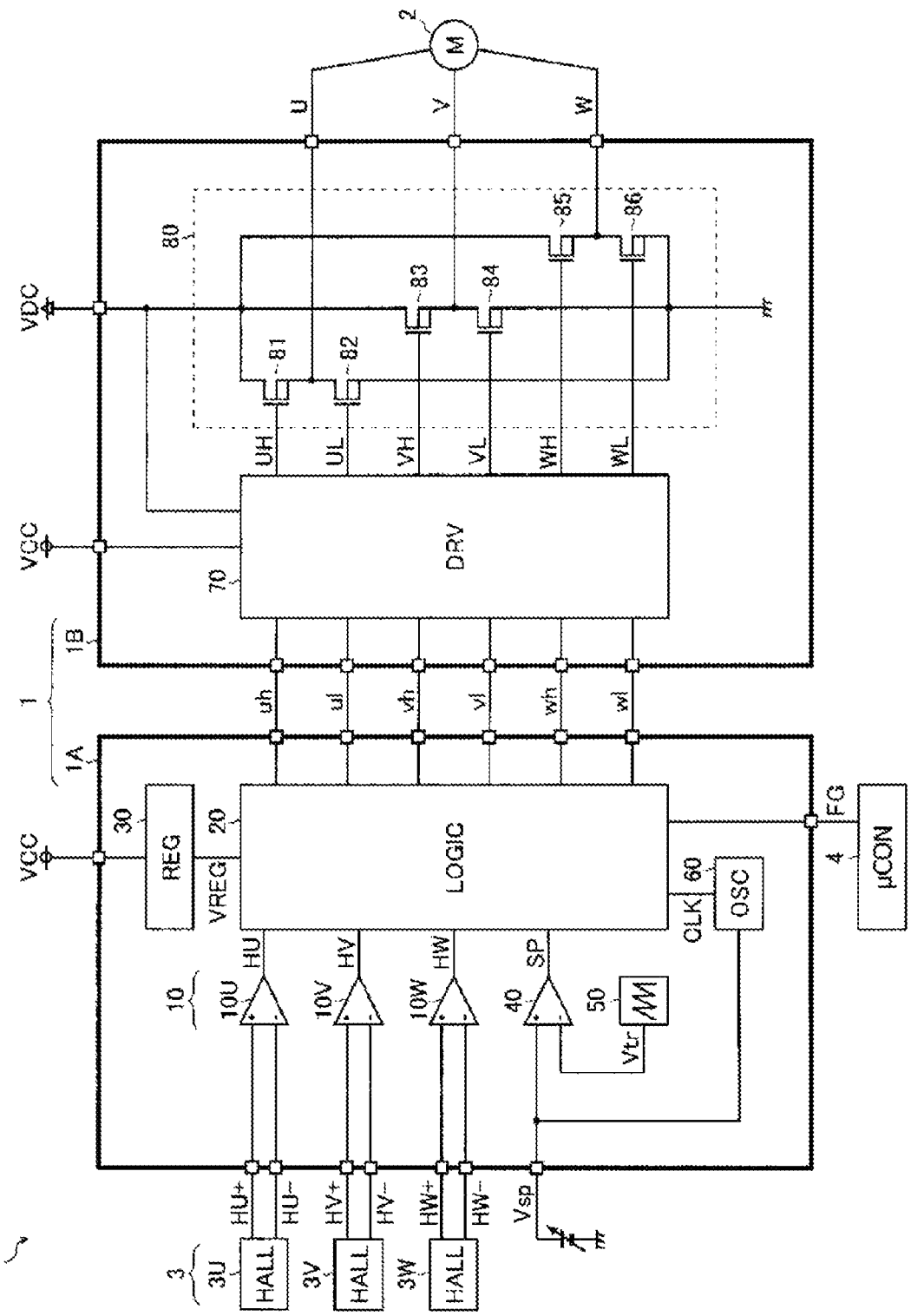
FIG. 1 is a block diagram illustrating an overall configuration of an electric device.

FIG. 1 is a block diagram illustrating an overall configuration of an electric device having a motor driving device. An electric device X according to one embodiment includes a motor driving device 1, a 3-phase brushless direct current (DC) motor 2 (hereinafter, abbreviated as a "motor 2"), a hall sensor unit 3, and a microcomputer 4.

The motor driving device 1, which is a main part for driving the motor 2, includes a controller IC 1A that operates upon receiving a first source voltage VCC (for example, 10 to 18 V), and a driver IC 1B that operates upon receiving the first source voltage VCC and a second source voltage VDC (for example, 140 to 280 V). A position signal generating unit 10, a logic unit 20, a constant voltage generating unit 30, a power width modulation (PWM) comparator 40, a triangular wave oscillator 50, and a clock oscillator 60 are integrated in the controller IC 1A. Meanwhile, a switch driving unit 70 and a power switch unit 80 are integrated in the driver IC 1B.

Further, in the controller IC 1A, an output protection circuit (overcurrent/overheat/low voltage/motor stall/external abnormality) (not shown) may also be integrated, but detailed descriptions thereof are omitted.

In addition, separated configurations of the controller IC 1A and the driver IC 1B are not limited to this embodiment. For example, the switch driving unit 70 may be integrated in the controller IC 1A and the power switch unit 80 may be formed as a discrete component. Also, the controller IC 1A and the driver IC 1B may be integrated in a single package.

The position signal generating unit 10 is circuitry that generates square wave position signals HU, HV, and HW corresponding to a position of a rotor of the motor 2 and that includes hall comparators with hysteresis 10U, 10V, and 10W provided respectively for respective phases (U phase, V phase, and W phase) of the motor 2. The hall comparators 10U, 10V, and 10W respectively compare hall signals of positive/negative polarities for each phase (HU+/HU−, HV+/HV−, and HW+/HW−) that are input from each of the hall sensors 3U, 3V, and 3W to generate the above-mentioned position signals HU, HV, and HW.

The logic unit 20 is a logical circuit that operates upon receiving a clock signal CLK. The logic unit 20 generates conduction control signals for each phase (uh/ul, vh/vl, and wh/wl) to control conduction of the motor 2 at an appropriate excitation phase switching timing based on the position signals HU, HV, and HW. Further, the logic unit 20 generates an RPM detection signal FG (an FG [frequency generator] signal with a frequency varied depending on an RPM of the motor 2) from the position signals HU, HV, and HW and transfers the generated RPM detection signal FG to the microcomputer 4. In addition, the logic unit 20 performs chopping driving of the conduction control signals (uh/ul, vh/vl, and wh/wl) according to a PWM signal SP to allow the RPMs of the motor 2 to be a desired target RPM. In addition to the above-mentioned functions, the logic unit 20 also has, for example, a function of changing the number of output pulses (four pulses (for one phase)/12 pulses (for 3phase synthesis)) of the RPM detection signal FG, a function of changing a rotation direction (forward rotation/reverse rotation) of the motor 2, a function of phase control (advance angle control) of the conduction control signals (uh/ul, vh/vl, and wh/wl), according to external signals (not shown).

The constant voltage generating unit 30 generates a constant voltage VREG (for example, 5V) from the first source voltage VCC and supplies the generated constant voltage VREG to each part (e.g., the logic unit 20) of the controller IC 1A.

The PWM comparator 40 compares an RPM command voltage Vsp applied to a non-inverting input terminal (+) and a triangular wave voltage Vtr applied to an inverting input terminal (−) to generate a PWM signal SP. When the RPM command voltage Vsp is higher than the triangular wave voltage Vtr, the PWM signal SP has a high level, and when the RPM command voltage Vsp is lower than the triangular wave voltage Vtr, the PWM signal SP has a low level. Thus, the higher the RPM command voltage Vsp becomes, the higher an output duty Dsp (a ratio of a high level period to one cycle of the PWM signal SP) becomes.

The triangular wave oscillator 50 generates a triangular wave voltage Vtr with a predetermined frequency (for example, 16 to 20 kHz). Further, an oscillation frequency of the triangular wave voltage Vtr may be arbitrarily adjusted using an externally attached resistor.

The clock generator 60 generates a clock signal CLK with an oscillation frequency f and outputs the same to the logic unit 20. In particular, the clock generator 60 has a function of switching the oscillation frequency f of the clock signal CLK depending on the RPM command voltage Vsp (equivalent to an RPM command signal) input to set a target RPM of the motor 2. Also, an internal configuration and operation of the clock oscillator 60 will be described in detail hereinafter.

The switch driving unit 70 operates upon receiving a first source voltage VCC and a second source voltage VDC, performs predetermined signal processing (e.g., level shifting, waveform shaping, simultaneous ON preventing process) on the conduction control signals (uh/ul, vh/vl, and wh/wl) to generate switch driving signals (UH/UL, VH/VL, and WH/WL) of each phase, and outputs them to the power switch unit 80.

The power switch unit 80, which is an output end that generates each of the conduction signals (U, V, and W) for each phase depending on the switch driving signals (UH/UL, VH/VL, and WH/WL). The power switch unit 80 includes power transistors 81 to 86 (e.g., metal oxide semiconductor field effect transistor (MOSFET), insulated gate bipolar transistor (IGBT)). Drains of upper power transistors 81, 83, and 85 are all connected to a terminal to which the second source voltage VDC is applied. Sources and back gates of the upper power transistors 81, 83, an 85 and drains of lower power transistors 82, 84, and 86 are connected to phase terminals of the motor 2, respectively. Sources and back gates of the lower power transistors 82, 84, and 86 are all connected to a ground terminal In the configuration of this embodiment, N channel-type power transistors are used for all of the power transistors 81 to 86. However, alternatively, P channel-type power transistors may be used for the upper power transistors 81, 83, and 85. In such case, a bootstrap circuit (not shown) may be omitted.

Figure 2:
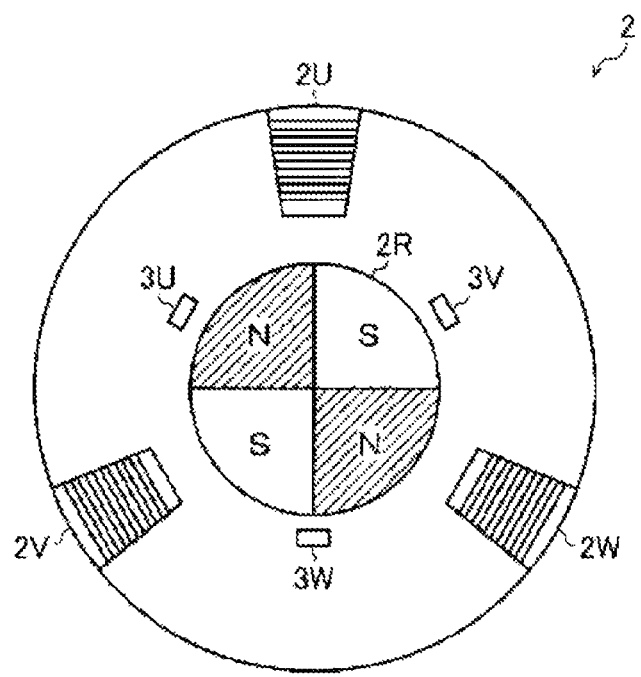
FIG. 2 is a schematic view illustrating an internal structure of a motor 2.

As illustrated in FIG. 2, the motor 2 is configured to have a structure that includes a rotor 2R having a 4-pole permanent magnet and stators 2U, 2V, and 2W of three slots in which coils are wound, respectively. Further, a combination of the number of poles and the number of slots is not limited to the 4-pole and 3-slot combination and any other combinations (e.g., 2-pole and 3-slot combination, and 4-pole and 6-slot combination) may also be employed.

As illustrated in FIG. 2, the hall sensor unit 3 includes hall sensors 3U, 3V, and 3W for each phase respectively provided at positions at electrical angular positions in phase with respect to the stators 2U, 2V, and 2W for each phase. The hall sensor unit 3 generates an analog voltage signal (hall signal) by detecting a magnetic field of the rotor 2R. Alternatively, a hall IC that generates a square wave signal, instead of the hall sensor unit 3, may also be used. In this case, the hall comparators 10U, 10V, and 10W of the controller IC 1A may be omitted. However, in order to cope with any of the external connections for the hall sensor and the hall IC, it is desirable for the controller IC 1A to be provided with the hall comparators 10U, 10V, and 10W.

The microcomputer 4 monitors the RPM detection signal FG generated by the controller IC 1A, thereby recognizing a rotational state of the motor 2.

<Conduction Control>

Figure 3:
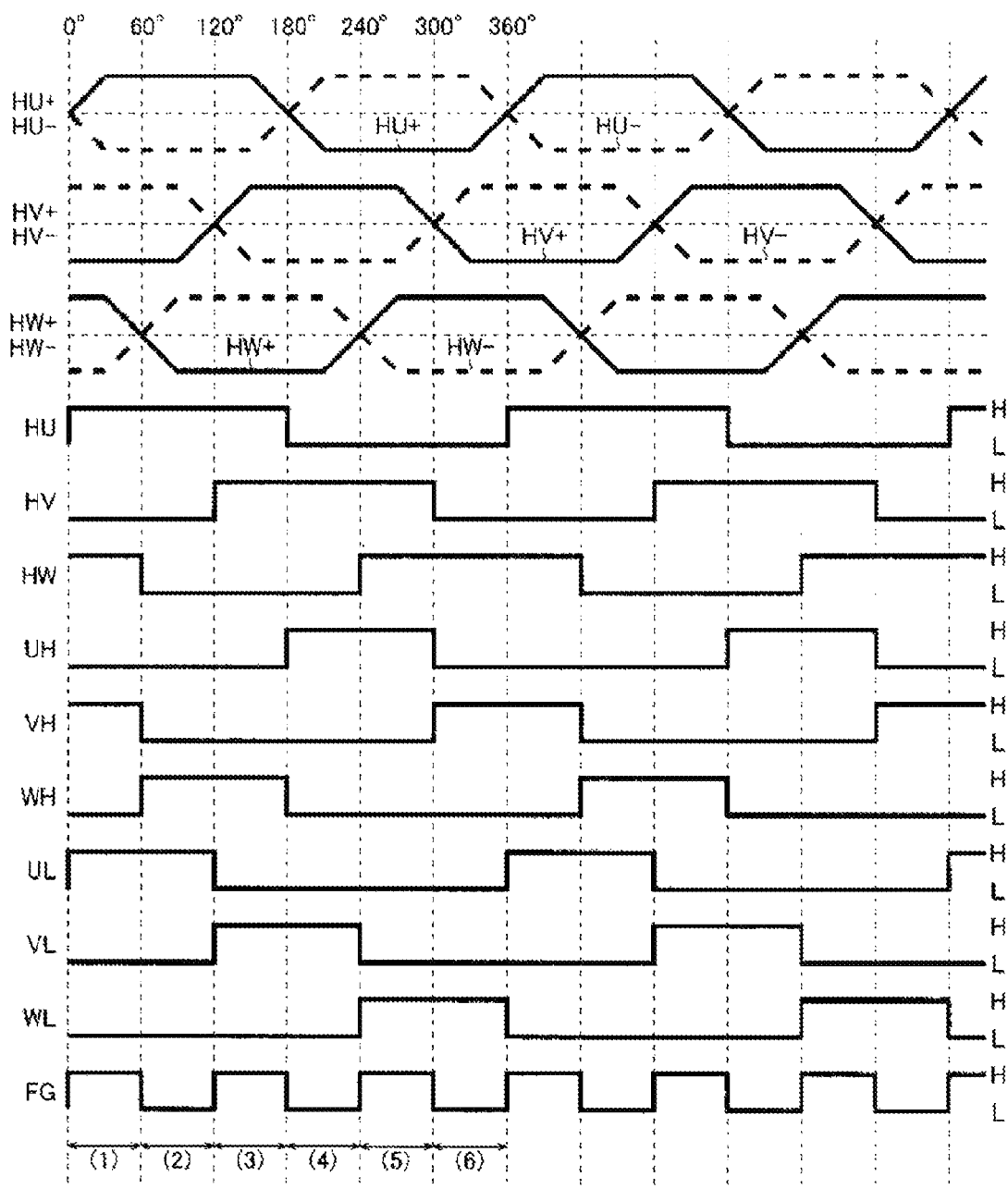
FIG. 3 is a time chart illustrating an operation example of a motor driving device 1.

FIG. 3 is a time chart illustrating an operation example (in the case of a 120° square wave conduction) of the motor driving device 1. From top to bottom in FIG. 3, hall signals (HU+/HU−, HV+/HV−, and HW+/HW−, position signals (HU, HV, and HW), switch driving signals (UH/UL, VH/VL, and WH/WL), and an RPM detection signal FG are shown in order.

At electrical angles 0°-60° (phase 1), the switch driving signals VH and UL have a high level and the switch driving signals UH, WH, VL, and WL have a low level, and thus, the power transistors 82 and 83 are turned on and the power transistors 81 and 84 to 86 are turned off. As a result, a driving current flows from a V-phase terminal to a U-phase terminal in the motor 2. At this point, the position signals HU and HW have a high level and the position signal HV has a low level. Further, the RPM detection signal FG has a high level.

At electrical angles 60°-120° (phase 2), the switch driving signals WH and UL have a high level and the switch driving signals UH, VH, VL, and WL have a low level, and thus, the power transistors 82 and 85 are turned on and the power transistors 81, 83, 84, and 86 are turned off. As a result, a driving current flows to a W-phase terminal and the U-phase terminal in the motor 2. At this point, the position signal HU has a high level and the position signals HV and HW have a low level. Further, the RPM detection signal FG has a low level.

At electrical angles 120°-180° (phase 3), the switch driving signals WH and VL have a high level and the switch driving signals UH, VH, UL, and WL have a low level, and thus, the power transistors 84 and 85 are turned on and the power transistors 81 to 83 and 86 are turned off. As a result, a driving current flows to the W-phase terminal and the V-phase terminal in the motor 2. At this point, the position signals HU and HV have a high level and the position signal HW has a low level. Further, the RPM detection signal FG has a high level.

At electrical angles 180°-240° (phase 4), the switch driving signals UH and VL have a high level and the switch driving signals VH, WH, UL, and WL have a low level, and thus, the power transistors 81 and 84 are turned on and the power transistors 82, 83, 85, and 86 are turned off. As a result, a driving current flows from the U-phase terminal to the V-phase terminal in the motor 2. At this point, the position signal HV has a high level and the position signals HU and HW have a low level. Further, the RPM detection signal FG has a low level.

At electrical angles 240°-300° (phase 5), the switch driving signals UH and WL have a high level and the switch driving signals VH, WH, UL, and VL have a low level, and thus, the power transistors 81 and 86 are turned on and the power transistors 82 to 85 are turned off. As a result, a driving current flows from the U-phase terminal to the W-phase terminal in the motor 2. At this point, the position signals HV and HW have a high level and the position signal HU has a low level. Further, the RPM detection signal FG has a high level.

At electrical angles 300°-360° (phase 6), the switch driving signals VH and WL have a high level and the switch driving signals UH, WH, UL, and VL have a low level, and thus, the power transistors 83 and 86 are turned on and the power transistors 81, 82, 84, and 85 are turned off. As a result, a driving current flows from the V-phase terminal to the W-phase terminal in the motor 2. At this point, the position signal HW has a high level and the position signals HU and HV have a low level. Further, the RPM detection signal FG has a low level.

Further, in FIG. 3, for simplicity, illustration of chopping driving of the switch driving signals (UH/UL, VH/VL, and WH/WL) is omitted.

In addition, a motor driving control scheme is not limited to the 120° conduction scheme described above. For example, alternatively, a 180° conduction scheme or a 150° conduction scheme may also be employed. For example, the 120° square wave conduction may be performed when the motor 2 starts, and then, if the RPM of the motor 2 rises to a sufficiently high level, the motor driving control scheme may be automatically switched to the 180° sine wave conduction. With this configuration, quietness may be increased when the motor 2 is normally operated.

<Clock Oscillator>

Figure 4:
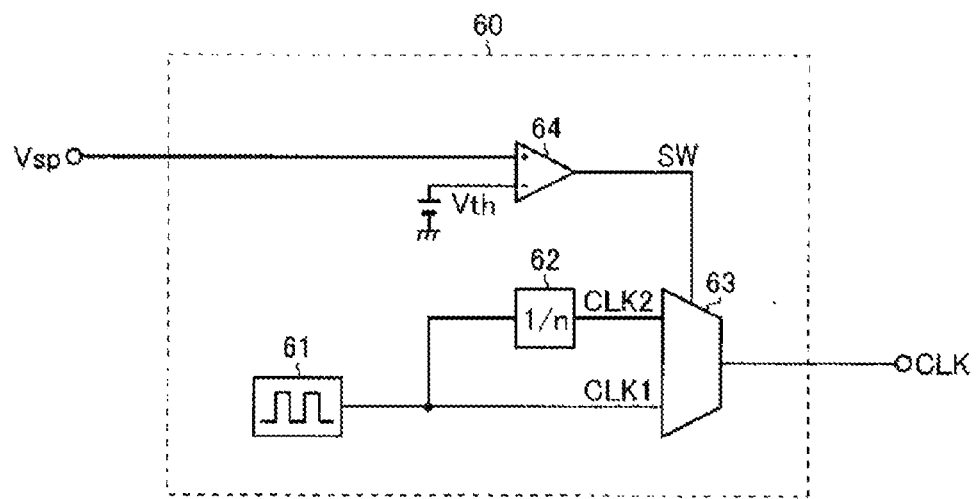
FIG. 4 is a block diagram illustrating an exemplary configuration of a clock oscillator 60.

FIG. 4 is a block diagram illustrating a configuration example of the clock oscillator 60. The clock oscillator 60 according to the exemplary configuration includes a master clock oscillating circuit 61, a dividing circuit 62, a selecting circuit 63, and a comparing circuit 64.

The master clock oscillating circuit 61 generates a master clock signal CLK1 with a first oscillation frequency f1 (for example, 8 MHz).

The dividing circuit 62 divides the master clock signal CLK1 by a dividing ratio n (for example, 1/16) to generate a divided clock signal CLK2 with a second oscillation frequency f2 (for example, 500 kHz).

The selecting circuit 63 selectively outputs one of the master clock signal CLK1 and the divided clock signal CLK2, as a clock signal CLK, depending on a switching signal SW. More specifically, when the switching signal SW has a high level, the selecting circuit 63 selectively outputs the master clock signal CLK1 as the clock signal CLK, and when the switching signal SW has a low level, the selecting circuit 63 selectively outputs the divided clock signal CLK2 as the clock signal CLK.

The comparing circuit 64 compares the RPM command voltage Vsp applied to a non-inverting input terminal (+) and a threshold voltage Vth applied to an inverting input terminal (−) to generate the switching signal SW. When the RPM command voltage Vsp is higher than the threshold voltage Vth, the switching signal SW has a high level, and when the RPM command voltage Vsp is lower than the threshold voltage Vth, the switching signal SW has a low level.

In this manner, the clock oscillator 60 has a function of switching the oscillation frequency f of the clock signal CLK based on the result obtained by comparing the RPM command voltage Vsp input as an RPM command signal and the predetermined threshold voltage Vth.

Figure 5:
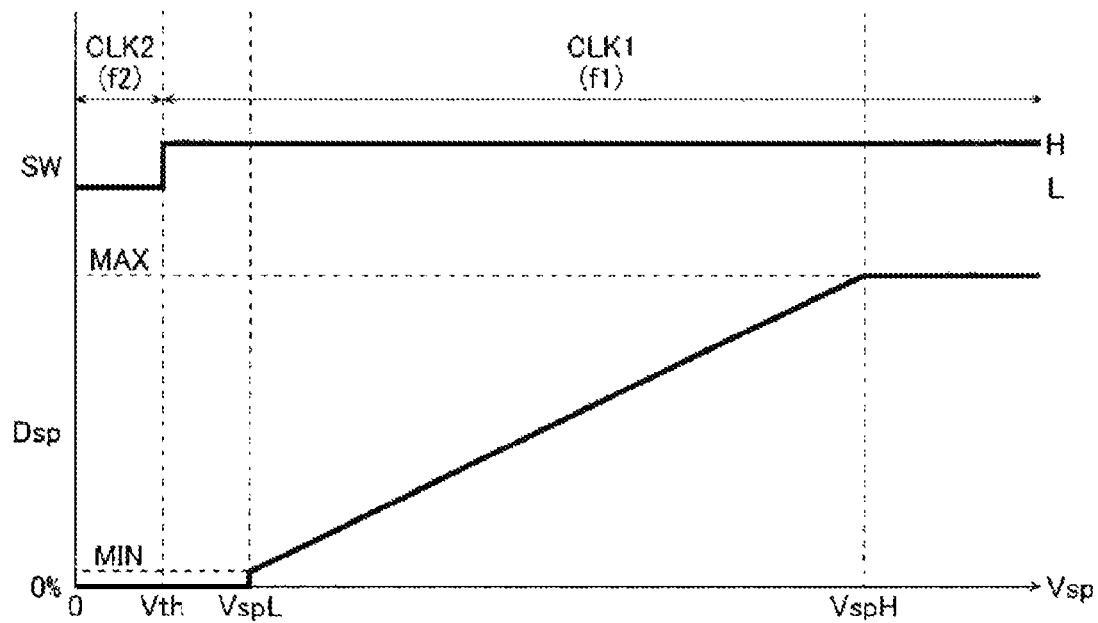
FIG. 5 is a view illustrating the correlation of an output duty Dsp and a switching signal SW with respect to an RPM command voltage Vsp.

FIG. 5 is a view illustrating a correlation between an output duty Dsp and the switching signal SW with respect to the RPM command voltage Vsp. When the RPM command voltage Vsp (having a variable range from 0.3 to 20 V, for example) is set to a voltage value lower than a minimum duty voltage VspL (for example, 2.1 V), the output duty Dsp becomes 0% and the motor 2 is stopped. Meanwhile, when the RPM command voltage Vsp is set to be within a voltage range from the minimum duty voltage VspL to a maximum duty voltage VspH (for example, 5.4 V), the output duty Dsp is linearly varied within a duty range from a minimum duty MIN (for example, 1.8%) to a maximum duty MAX (for example, 100%) and the motor 2 is operated. Also, even when the RPM command voltage Vsp is set to a voltage value higher than the maximum duty voltage VspH, the output duty Dsp is maintained at the maximum duty MAX.

Further, when the RPM command voltage Vsp is higher than the threshold voltage Vth, the switching signal SW has a high level so that the master clock signal CLK1 is selectively output as the clock signal CLK. That is, when the RPM command voltage Vsp is higher than the threshold voltage Vth, the oscillation frequency f of the clock signal CLK is set to the first oscillation frequency f1. Meanwhile, when the RPM command voltage Vsp is lower than the threshold voltage Vth, the switching signal SW has a low level so that the divided clock signal CLK2 is selectively output as the clock signal CLK. That is, when the RPM command voltage Vsp is lower than the threshold voltage Vth, the oscillation frequency f of the clock signal CLK is set to the second oscillation frequency f2.

In addition, the threshold voltage Vth is set to have a voltage value lower than the minimum duty voltage VspL. By setting the threshold value in this manner, in the clock oscillator 60, when the RPM command voltage Vsp has a voltage value (Vsp≥VspL) at the time of the motor operation, the oscillation frequency f of the clock signal CLK is set to the first oscillation frequency f1, and when the RPM command voltage Vsp has a voltage value (Vsp=0V) at the time of the motor stop, the oscillation frequency f of the clock signal CLK is set to the second oscillation frequency f2 lower than the first oscillation frequency f1.

Figure 6:
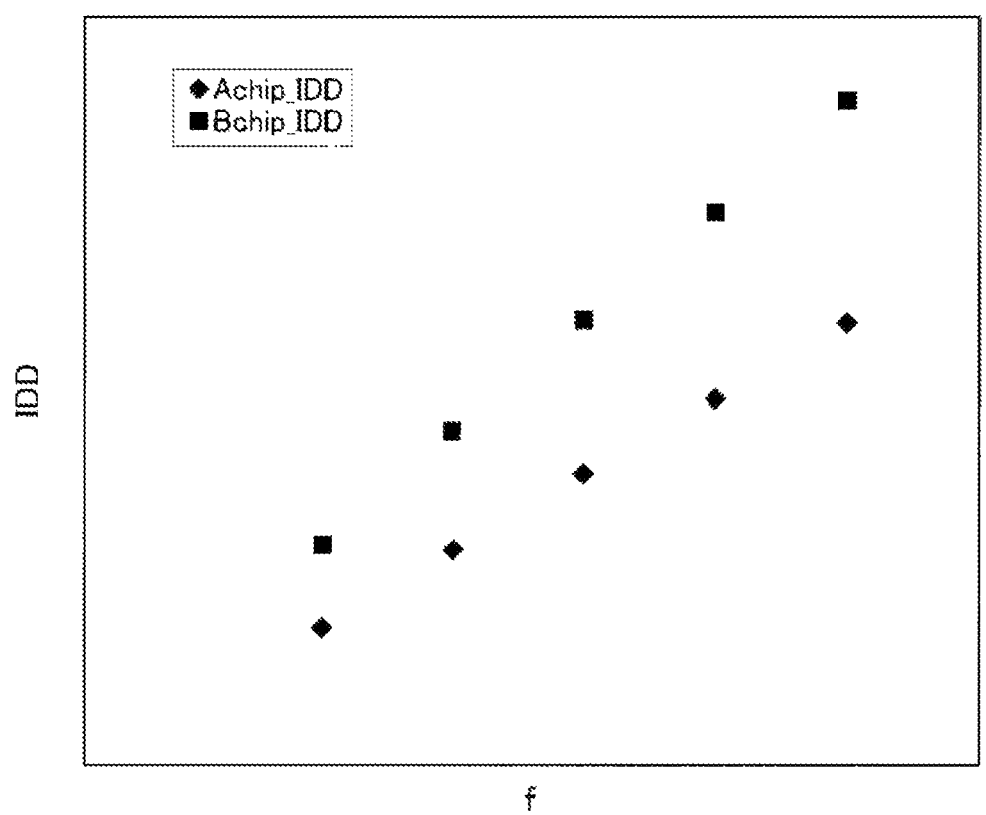
FIG. 6 is a view illustrating the correlation between an oscillation frequency f and current consumption IDD.

FIG. 6 is a view illustrating a correlation between the oscillation frequency f and current consumption IDD. Further, in FIG. 6, diamond-shaped marks represent current consumption IDD of an A chip in which a circuit size (the number of gates or the number of flip flops) of the logic unit 20 is relatively small, and the square marks represent current consumption IDD of a B chip in which a circuit size of the logic unit 20 is relatively large.

As illustrated in FIG. 6, it is noted that the lower the oscillation frequency f of the clock signal CLK, the more the driving current IDD of the logic unit 20 may be reduced. Thus, if the oscillation frequency f of the clock signal CLK is lowered when the operation of the motor 2 is stopped, the driving current IDD (further, standby power of the motor driving device 1) may be reduced without causing the operation of the logic unit 20 to stop.

In particular, when a complicated signal processing is required in controlling conductions of the motor 2 (for example, when the motor 2 is driven with a sine wave), the circuit size of the logic unit 20 is increased, and thus, the effect of reducing the current consumption IDD resulting from the lowering of the oscillation frequency f is remarkable (see the square marks in FIG. 6).

Further, as another method of reducing the current consumption IDD of the logic unit 20, driving the logic unit 20 at a low voltage may be considered. However, in order to implement the driving of the logic unit 20 at a low voltage, the controller IC 1A needs to perform a fine process, resulting in an increase in costs. With the scheme of lowering the oscillation frequency f of the clock signal CLK, the current consumption IDD of the logic unit 20 may be reduced without increasing the costs.

Figure 7:
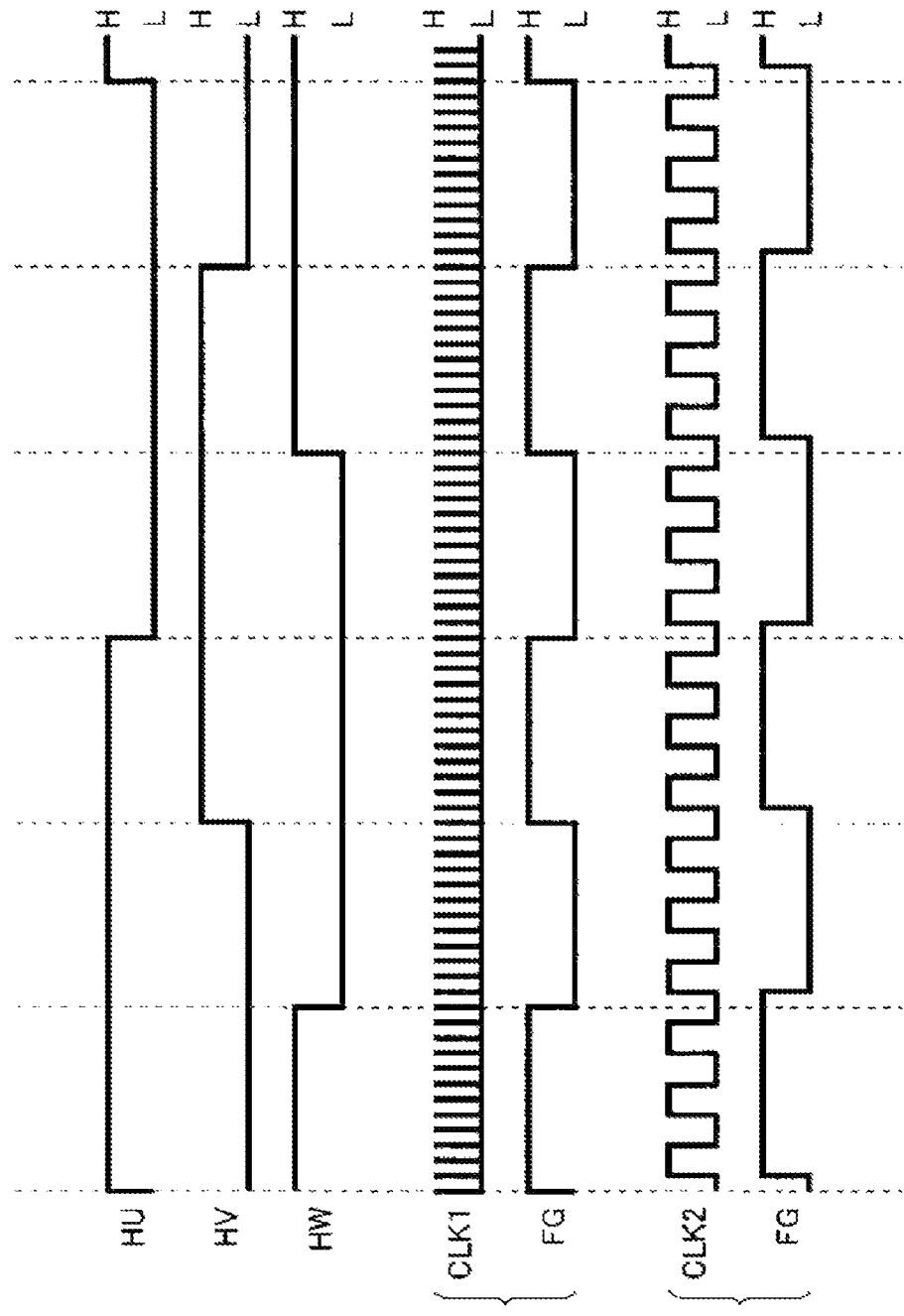
FIG. 7 is a time chart illustrating the correlation between frequency switching and precision of RPM detection.

FIG. 7 is a time chart illustrating the correlation between frequency switching and precision of RPM detection. From top to bottom in FIG. 7, position signals (HU, HV, and HW), a master clock signal CLK1, an RPM detection signal FG generated when the master clock signal CLK1 is selectively output, a divided clock signal CLK2, and an RPM detection signal FG generated when the divided clock signal CLK2 is selectively output are illustrated in order.

As can be seen from FIG. 7, when the low speed divided clock signal CLK2 is selectively output as the clock signal CLK, a latch timing of the position signals HU, HV, and HW deviates, compared to the case in which the high speed master clock signal CLK1 is selectively output, and thus, jitter of the RPM detection signal FG increases. In this case, however, a pulse frequency of the RPM detection signal FG is almost constant regardless of whichever one of the master clock signal CLK1 and the divided clock signal CLK2 are selectively output. Thus, lowering of the oscillation frequency f of the clock signal CLK when the operation of the motor 2 is stopped does not cause any trouble to the generation of the RPM detection signal FG in the logic unit 20 and the RPM of the motor 2 can be sufficiently monitored all the time with the microcomputer 4.

<Air-Conditioner>

Figure 8:
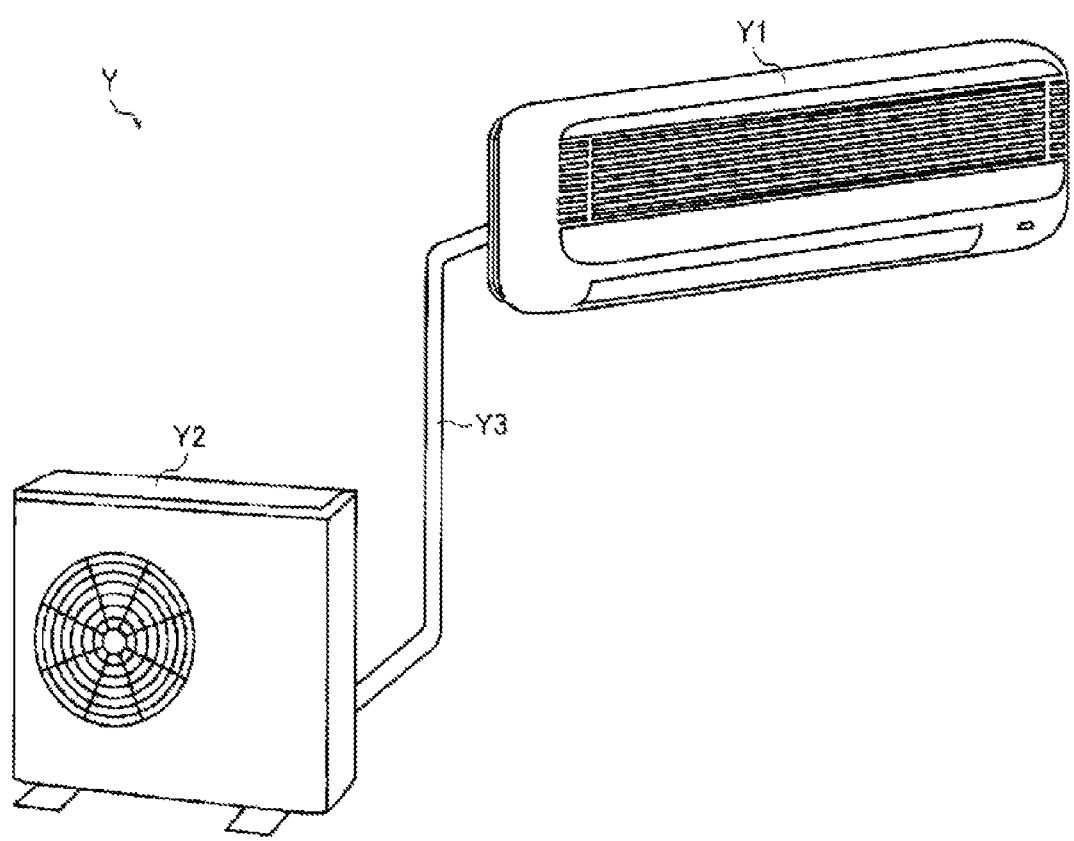
FIG. 8 is a view illustrating the outer appearance of a configuration example of an air-conditioner.

FIG. 8 is a view illustrating the outer appearance of a configuration example of an air-conditioner. An air-conditioner Y according to the present embodiment specifically represents an example of the electric device X equipped with the motor driving device 1 (see FIG. 1). The air-conditioner Y includes an indoor unit Y1, an outdoor unit Y2, and a pipe Y3 for connecting the indoor unit Y1 and the outdoor unit Y2. Further, the indoor unit Y1 may include an evaporator or an indoor fan, and the outdoor unit Y2 may include a compressor, a condenser, an expansion valve, and an outdoor fan.

During a cooling operation of the air-conditioner Y, first, a refrigerant is compressed by the compressor of the outdoor unit Y2 to generate a high temperature and high pressure gas. Heat dissipation is then performed by the condenser of the outdoor unit Y2 to liquefy the refrigerant. At this point, in order to accelerate heat dissipation, the outdoor fan may be rotated to expose the condenser to generate wind, and thus, hot wind may start to blow in the outdoor unit Y2. Thereafter, the liquefied refrigerant is decompressed by the expansion valve of the outdoor unit Y2 to generate a low temperature and low pressure liquid. The low temperature and low pressure liquid is then delivered to the indoor unit Y1 through the pipe Y3 and vaporized by the evaporator of the indoor unit Y1. At this point, the evaporator has a low temperature due to heat of vaporization of the refrigerant. The indoor fan is controlled to be rotated to generate wind to be brought into contact with the evaporator, thus cold wind is discharged to an indoor area from the indoor unit Y1. The vaporized refrigerant is delivered back to the outdoor unit Y2 through the pipe Y3, and the foregoing heat exchanging process is then repeatedly performed.

Further, during a heating operation of the air-conditioner Y, except that a circulation direction of the refrigerant is reversed and the roles of the evaporator of the indoor unit Y1 and the condenser of the outdoor unit Y2 are interchanged, substantially the same heat exchanging process as the described above is performed.

In the air-conditioner Y according to the present embodiment, the aforementioned motor driving device 1 may be very appropriately used as a driving unit of a fan motor for rotating the outdoor fan or the indoor fan. As described above, in the motor driving device 1, by lowering the oscillation frequency f of the clock signal CLK when the operation of the motor 2 is stopped, the current consumption IDD can be highly reduced without stopping the operation (generation process of the RPM detection signal FG) of the logic unit 20.

Thus, when the motor driving device 1 is used as a driving unit of the fan motor, standby power of the air-conditioner Y can be reduced, while constantly monitoring a rotation state of the fan motor. In particular, since the outdoor fan installed in an outdoor area may be rotated due to the reception of wind even while the fan motor is not being operated, it is very critical for a system to recognize a rotational state of the outdoor fan all the time.

<Other Modified Examples>

Various technical features disclosed in the present disclosure may be modified variously within the scope of the major gist of the technical creation, in addition to the foregoing embodiment. For example, for detecting a position of a rotor, it is also possible to consider a way of monitoring an induction voltage generated in a motor coil, in addition to the ways of using a hall sensor or a hall IC. Also, in addition to an analog voltage signal, a PWM signal or a digital signal may also be considered as an RPM command signal.

According to the present disclosure in some embodiments, it is possible to reduce standby power, while monitoring rotation of a motor.

The present disclosure can be used for a motor driving device of home appliances (e.g., an air conditioner, an air cleaner, a hot water pump, a dish washer, and a washing machine) or office automation (OA) devices.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driving device, comprising:
a clock oscillator configured to generate a clock signal; and
a logic unit configured to receive the clock signal, control conduction of a 3-phase brushless direct current (DC) motor, and generate a revolutions per minute (RPM) detection signal,
wherein the clock oscillator is configured to switch an oscillation frequency of the clock signal depending on an RPM command signal input to set a target RPM of the 3-phase brushless DC motor, and
wherein the clock oscillator is configured to set the oscillation frequency of the clock signal as a first oscillation frequency when the RPM command signal has a signal value for an operation time of the motor, and to set the oscillation frequency of the clock signal as a second oscillation frequency lower than the first oscillation frequency when the RPM command signal has a signal value for a stoppage time of the motor.

2. The motor driving device of claim 1, wherein the clock oscillator is configured to switch the oscillation frequency of the clock signal based on a comparison result of an RPM command voltage input as the RPM command signal and a predetermined threshold voltage.

3. The motor driving device of claim 2, wherein the clock oscillator comprises:
a master clock oscillating circuit configured to generate a master clock signal;
a dividing circuit configured to divide the master clock signal to generate a divided clock signal;
a selecting circuit configured to selectively output one of the master clock signal and the divided clock signal as the clock signal depending on a switching signal; and
a comparing circuit configured to compare the RPM command voltage and the threshold voltage to generate the switching signal.

4. The motor driving device of claim 2, further comprising:
a triangular wave oscillator configured to generate a triangular wave voltage with a predetermined frequency; and
a pulse width modulation (PWM) comparator configured to compare the RPM command voltage and the triangular wave voltage to generate a PWM signal,
wherein the logic unit is configured to control an RPM of the 3-phase brushless DC motor depending on the PWM signal.

5. The motor driving device of claim 1, further comprising:
a position signal generating unit configured to generate a position signal depending on a position of a rotor of the 3-phase brushless DC motor,
wherein the logic unit is configured to control excitation phase switching of the 3-phase brushless DC motor and generate the RPM detection signal depending on the position signal.

6. The motor driving device of claim 5, wherein the position signal generating unit is configured to receive a hall signal from a hall sensor or a hall IC to generate the position signal.

7. The motor driving device of claim 5, wherein the position signal generating unit is configured to monitor an induction voltage generated in a motor coil to generate the position signal.

8. An electric device, comprising:
a 3-phase brushless DC motor;
the motor driving device according to claim 1 for driving the 3-phase brushless DC motor; and
a microcomputer configured to monitor an RPM detection signal generated by the motor drive device.

9. The electric device of claim 8, wherein the 3-phase brushless DC motor is a fan motor for rotating a fan.

* * * * *